June 22, 1926. Re. 16,368

C. G. NELSON

METAL WINDOW SASH

Original Filed Dec. 18, 1924

Inventor
Charles G. Nelson.

By Owen + Owen

Attorneys

Patented June 22, 1926. Re. 16,368

UNITED STATES PATENT OFFICE.

CHARLES G. NELSON, OF CHICAGO HEIGHTS, ILLINOIS, ASSIGNOR TO ZOURI DRAWN METALS COMPANY, OF CHICAGO HEIGHTS, ILLINOIS, A CORPORATION OF ILLINOIS.

METAL WINDOW SASH.

Original No. 1,570,702, dated January 26, 1926, Serial No. 756,653, filed December 18, 1924. Application for reissue filed May 15, 1926. Serial No. 109,438.

My invention relates to a metal window sash and more particularly to a bracket for use in such a sash.

The construction and object of my invention will appear as the description proceeds.

Figure 1:
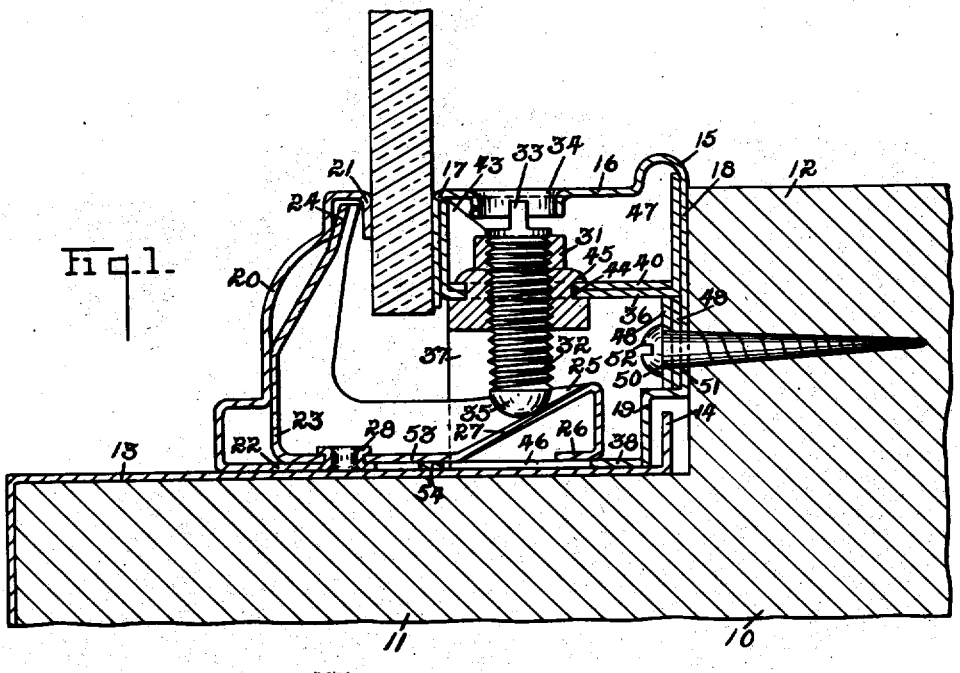
Figure 2:
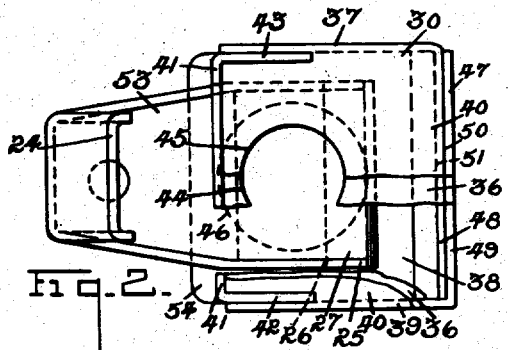
Figure 3:
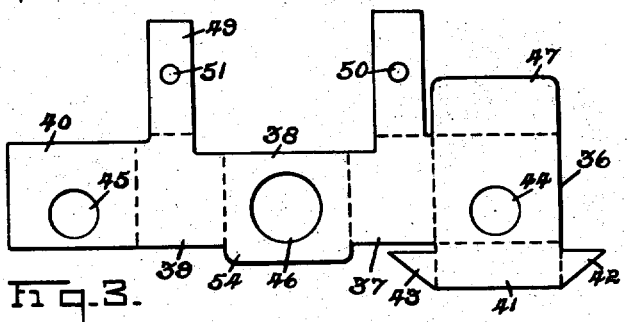

In the accompanying drawing forming a part of this specification, Figure 1 is a cross section of a sash having my improved clamping device applied thereto; Fig. 2 is a plan view of the clamping members, parts being broken away; Fig. 3 shows the blank from which my new bracket is formed.

The sash is shown applied to a lower frame member or sill 10, which has a horizontal portion 11 beneath the glass and a riser 12 behind the lower edge of the glass. This sill is shown with a sheet metal cover 13 having an upturned flange 14 at its rear edge next to the riser. An inner glass engaging member 15 has a substantially horizontal portion 16, the front edge of which is turned down to form a flange or lip 17 adapted to engage the rear face of the glass. At the rear edge of horizontal portion 16 there is a downwardly directed flange 18 having an offset portion 19 adapted to extend downward in front of flange 14 of sill cover 13.

The outer glass engaging member 20 is shown with a lip 21 and with a substantially horizontal flange 22 at its lower edge adapted to rest on sill cover 13. A substantially L-shaped member 23 has the upper end 24 of its upright member in position to engage lip 21, while the horizontal portion extends rearward beneath the glass, the rear end 25 being provided with a foot 26 and with a bevelled surface or cam portion 27. This L-shaped member is fastened to flange 22 by means of a rivet 28, the horizontal member acting as a draw bar for drawing and holding member 20 in place.

Between flanges 17 and 18 of member 15, there is a bracket 30 provided with a bushing 31 for a screw 32. This screw has an upstanding lug 33 accessible from above through an opening 34 in the horizontal portion of member 15. The lower end of the screw is provided with a rounded surface 35 adapted to contact surface 27 of member 23.

Bracket 30 is constructed of sheet metal, the blank for the bracket being shown in Fig. 3. This blank comprises an upper wall portion 36, a side wall portion 37 attached to one edge of wall portion 36, a bottom wall portion 38 attached to the lower edge of side wall portion 37, a side wall portion 39 attached to the other edge of bottom wall portion 38 and a top wall portion 40 attached to the upper edge of side wall portion 39.

When the blank is bent so that the wall portions assume their proper positions, portion 40 overlies portion 36. Then flange 41, extending from the front edge of portion 36, is bent upward and ears 42 and 43 at the ends of flange 41 are bent backward to overlie portion 40 and hold it in position. When the blank is assembled in this manner, openings 44 and 45 in portions 36 and 40 register and are ready to receive bushing 31, opening 46 in the lower wall portion being provided for convenience in securing the bushing in place.

Flange 47 on the rear of portion 36 is bent upward and fastening lugs 48 and 49, attached to the rear edges of side wall portions 37 and 39 are folded towards each other and overlapped so that perforations 50 and 51 register. The bracket thus formed can be positioned within the inner sash member and a screw 52, passing through registering perforations 50 and 51 and a registering perforation in flange 18 of member 15, secures the bracket and inner sash member in position against riser 12.

As will be readily seen, rear end 25 of L-shaped member 23 is inserted in bracket 30 resting upon bottom wall portion 38. Foot 26 rests upon wall portion 38 and horizontal portion 53 upon the forward edge of wall portion 38, which is extended forward at 54 so as to provide a broad bearing surface for this portion of member 23. In similar constructions hitherto used, turning down the screw against the cam surface of the clamping member has had a tendency to raise the bracket and distort the rear sash member. With the construction shown herein downward pressure upon surface 27 is transmitted through foot 26 and portion 53 to bottom wall portion 38 of the bracket, so that upward force exerted upon the upper wall of the bracket is balanced by downward force applied to the lower wall of the bracket and the raising effect of turning down the screw is thereby avoided. Furthermore, as foot 26 and portion 53 are upon opposite sides of the axial line of the screw, there is no twisting force exerted upon the bracket. The bracket is held by screw 52 against the forward pull exerted by member 23.

While I have shown a specific structure of glass contacting members and have disclosed them as located along the sill of a window, it will be obvious that the objects of my present invention are independent of the exact nature of the glass contacting members and, while I have shown in detail the structure of the bracket and a blank from which it may be made, it will be understood that considerable variations may be made in the material and shape of the bracket within the scope of the appended claims without departing from the spirit of the invention.

I claim:

1. In a structure of the class described, a glass-clamping member for one side of a sheet of glass, a draw-bar extending from said member to the other side of the sheet of glass and having a cam surface thereon adjacent its end, a bracket, and a screw passing through a portion of the bracket and engaging said cam surface, the bracket having a portion engaging the draw-bar on the side opposite the cam surface and preventing thrust of the screw against the cam surface from exerting a twisting force on either the bracket or draw-bar.

2. In a structure of the class described, glass-clamping members on opposite sides of a sheet of glass, a bracket attached to one of said members, a draw-bar attached to the other of said members and having thereon a cam surface, and a screw passing through a portion of said bracket and engaging said cam surface, the bracket having a portion engaging the draw-bar on the side opposite the cam surface and preventing thrust of the screw against the cam surface from exerting a twisting force on either the bracket or draw-bar.

3. In a structure of the character described, a glass-clamping member for one side of a sheet of glass, a draw-bar extending from said member to the other side of the sheet of glass, a fixed bracket on said other side of the sheet and having an opening receiving the end of said draw-bar, there being a cam surface on the portion of the draw-bar within the bracket, and a screw passing through the wall of the bracket into said opening and engaging said cam surface.

4. In a structure of the class described, glass-clamping members on opposite sides of a sheet of glass, a bracket attached to one of said members and having an opening directed towards the other of said members, a draw-bar extending from said other member into said opening, the portion of the draw-bar within the bracket having a cam surface, and a screw passing through the wall of the bracket on one side of said opening and adapted to engage said cam surface.

5. In a structure of the class described, a glass-clamping member for one side of a sheet of glass, a stationary frame member on the other side of said sheet, a bracket fixed to said frame member and having an opening directed towards said clamping member, a draw-bar extending from said clamping member into said opening, the portion of the draw-bar within the bracket being provided with a cam surface, and a screw passing through the wall of the bracket and engaging said cam surface.

6. In a structure of the character described, a glass-clamping member for one side of a sheet of glass, a draw-bar extending from said member to the other side of the sheet of glass, a fixed bracket on said other side of the sheet and having an opening receiving the end of said draw-bar, there being a cam surface on the portion of the draw-bar within the bracket, a screw passing through the wall of the bracket and engaging said cam surface, and a glass clamping member attached to a stationary frame member and adapted to engage the glass sheet on the side opposite the first said clamping member.

7. In a structure of the class described, a glass-clamping member on one side of a sheet of glass, a sheet metal bracket of approximately box form on the other side of the sheet of glass and with its bottom away from said sheet, a draw-bar extending from said member into said box and having a cam surface on its portion within the box, a screw passing through the wall of the box and engaging said cam surface, and means to prevent the movement of the bracket towards said member.

8. In a structure of the class described, sheet metal sash members adapted to engage opposite sides of a sheet of glass, a sheet metal bracket of substantially box form engaging one of said members and having its open side towards the other member, a clamping device engaging said other member and having an arm extending into the bracket through its open side, there being a cam surface on the portion of the arm within the bracket, and a screw passing through the bracket wall and engaging said cam surface.

9. In a structure of the character described, a glass-clamping member for one side of a sheet of glass, a draw-bar extending from said member to the other side of the sheet of glass, a fixed bracket on said other side of the sheet and having an opening receiving the end of the draw-bar, a screw passing through the wall of the opening in the bracket and engaging the draw-bar and holding it against the other wall of said opening, and a glass engaging member on the same side of the glass as the bracket.

10. In a structure of the character described, a glass-clamping member for one side of a sheet of glass, a draw-bar extending from said member to the other side of the sheet of glass, a fixed bracket on said other side of the sheet and having an opening therein adapted to receive the end of the draw-bar a variable distance, and a screw passing through the metal of said bracket on one side of the opening and adapted to engage the end of the draw-bar within the opening and press it against the opposite wall of the opening.

11. In a structure of the character described, a glass-clamping member for one side of a sheet of glass, a draw-bar extending from said member to the other side of the sheet of glass, a fixed bracket on said other side of the sheet, said bracket comprising a metal wall on one side of the end of the draw-bar, a screw passing through said wall and engaging said draw-bar, a wall on the opposite side of the draw-bar, and members rigidly connecting said walls adjacent each edge of said draw-bar.

In testimony whereof, I have hereunto signed my name to this specification.

CHARLES G. NELSON.